Oct. 16, 1962  B. LEIBINGER  3,058,380
PUNCH PRESS
Filed Oct. 29, 1958  6 Sheets-Sheet 1

INVENTOR
Berthold Leibinger

BY  Michael S. Striker
ATTORNEY

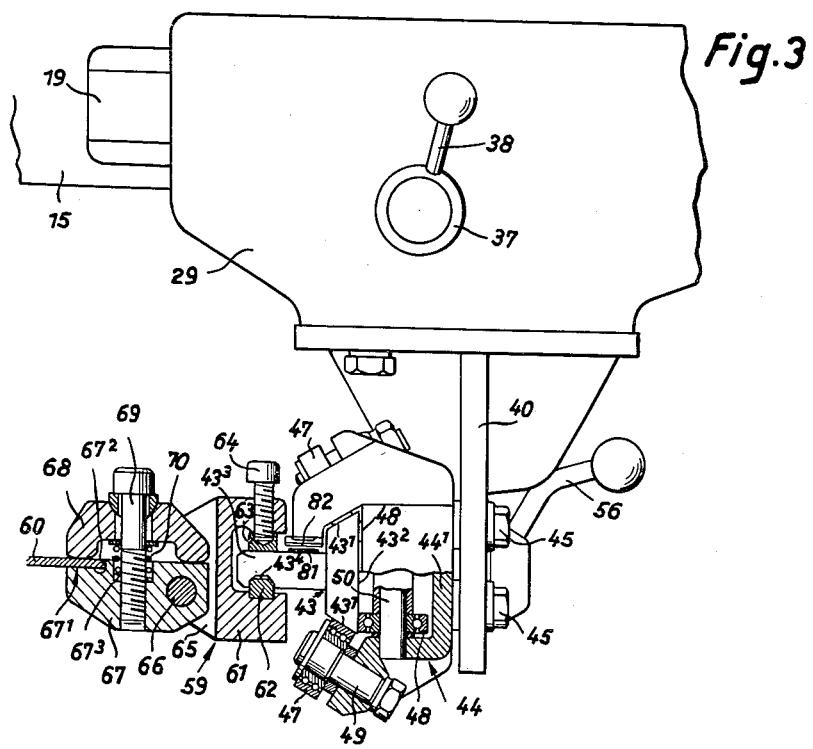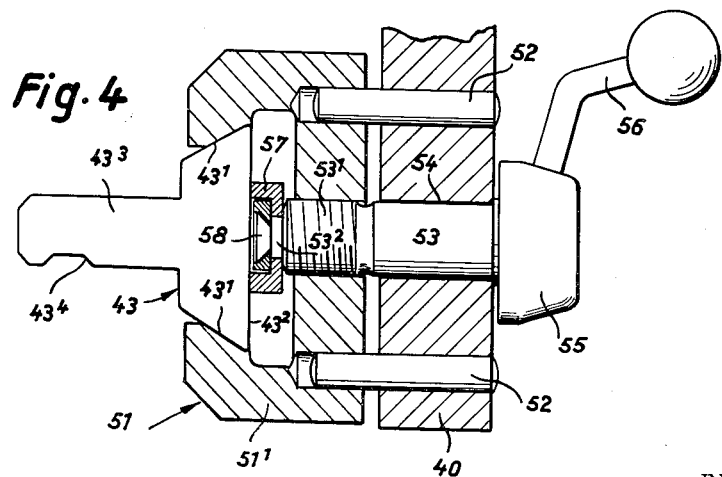

Oct. 16, 1962  B. LEIBINGER  3,058,380
PUNCH PRESS

Filed Oct. 29, 1958  6 Sheets-Sheet 5

INVENTOR
Berthold Leibinger

BY
Richard S. Striker
ATTORNEY

Oct. 16, 1962   B. LEIBINGER   3,058,380
PUNCH PRESS
Filed Oct. 29, 1958   6 Sheets-Sheet 6
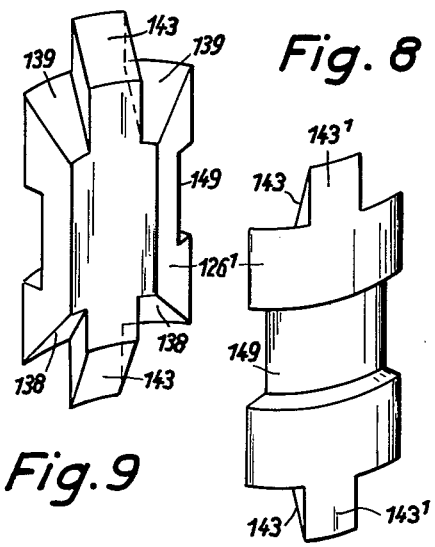
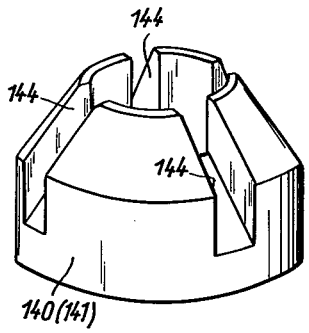
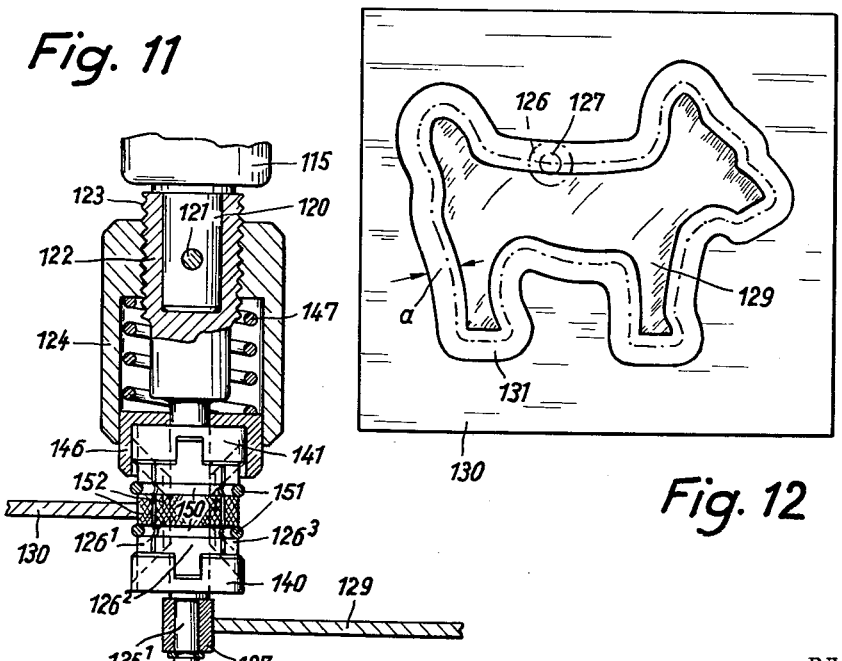
INVENTOR
Berthold Leibinger
BY
Richard S. Striker
ATTORNEY

United States Patent Office 3,058,380
Patented Oct. 16, 1962

3,058,380
PUNCH PRESS
Berthold Leibinger, Stuttgart-Weilimdorf, Germany, assignor to Messrs. Trumpf & Co., Stuttgart-Weilimdorf, Germany
Filed Oct. 29, 1958, Ser. No. 770,461
Claims priority, application Germany Dec. 6, 1957
10 Claims. (Cl. 83—410)

The present invention relates to machine tools.

More particularly, the present invention relates to punch presses.

One of the objects of the present invention is to provide a punch press which is capable of cutting from a work sheet material extending along a predetermined path so as to form a slot in the work sheet which, when one of the ends of the slot become joined to each other, provides a sheet portion of predetermined configuration which is cut by the punch press from the work sheet.

Another object of the present invention is to provide a punch press of the above type which is not only capable of cutting along a predetermined path of the work sheet but which in addition is capable of automatically guiding the work sheet so as to cut therefrom a portion having a configuration determined by a template.

A further object of the present invention is to provide a punch press with a relatively simple and at the same time reliable work holding carriage structure which is capable of moving the work sheet in all directions in its own plane so that there is no restriction on the configuration of a portion of the work sheet which is cut therefrom by the punch press.

An additional object of the present invention is to provide for use in a machine tool of the above type a structure capable of reliably cooperating with a template so as to properly guide the work even though there may be inaccuracies in one part of the template as compared with another part thereof.

It is also an object of the present invention to provide for a machine tool of the above type an automatic feeding means for feeding the work sheet in various directions so as to automatically cut therefrom a portion of a predetermined configuration.

The objects of the present invention also include the provision of a machine tool of the above type which need not be operated from a template but which at the same time can be accurately controlled by the operator so as to cut the work sheet accurately in a desired manner.

It is also an object of the present invention to provide a punch press of the type which will not excessively wear the punch at one side thereof even though this one side of the punch is the side which does most of the work during the advance of the work sheet in a step-by-step manner to enable the punch to cut from the work sheet a portion thereof which will have a predetermined configuration.

With the above objects in view, the present invention includes in a machine tool for cutting a work sheet a punch press means having upper and lower substantially horizontal and parallel arms, this punch press means further including a reciprocable punch carried by the upper arm adjacent a front end thereof and a die carried by the lower arm adjacent a front end thereof beneath the punch to cooperate therewith. A longitudinally movable carriage means is carried by the upper arm of the punch press means between the upper and lower arms thereof for longitudinal movement along this upper arm toward and away from the punch of the punch press means, and this longitudinally movable carriage means itself carries a transversely movable carriage means which is movable longitudinally with the longitudinal carriage means and which at the same time is transversely movable with respect to the longitudinal carriage means and the arms.

The transversely movable carriage means carries a work holding means which supports a work sheet in a given plane while the work sheet is acted upon by punch press means, and the longitudinal and transverse carriage means are capable of cooperating with each other so as to move the work sheet in all directions in the plane in which it is supported by the work holding means. Suitable scales may be provided to cooperate with both of the carriage means so that the extent of movement thereof can be determined by the operator to enable a cut of predetermined dimensions to be taken in the work sheet. However, it is also possible to support on an additional carriage carried by the lower arm of the punch press means a template, and a feed roller and template feeler carried by a motor which drives the feed roller and which itself is carried by the transverse carriage means may cooperate with the template for automatically operating the longitudinal and transverse carriage means so as to cut from the work sheet a portion having a configuration corresponding to that of the template. Furthermore, in order to prevent excessive wear of the punch, the latter is formed with an axial bore extending inwardly from its bottom end, and a guide pin is carried by the punch press means and extends into this axial bore to guide the punch for axial movement during its cutting of the work sheet.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
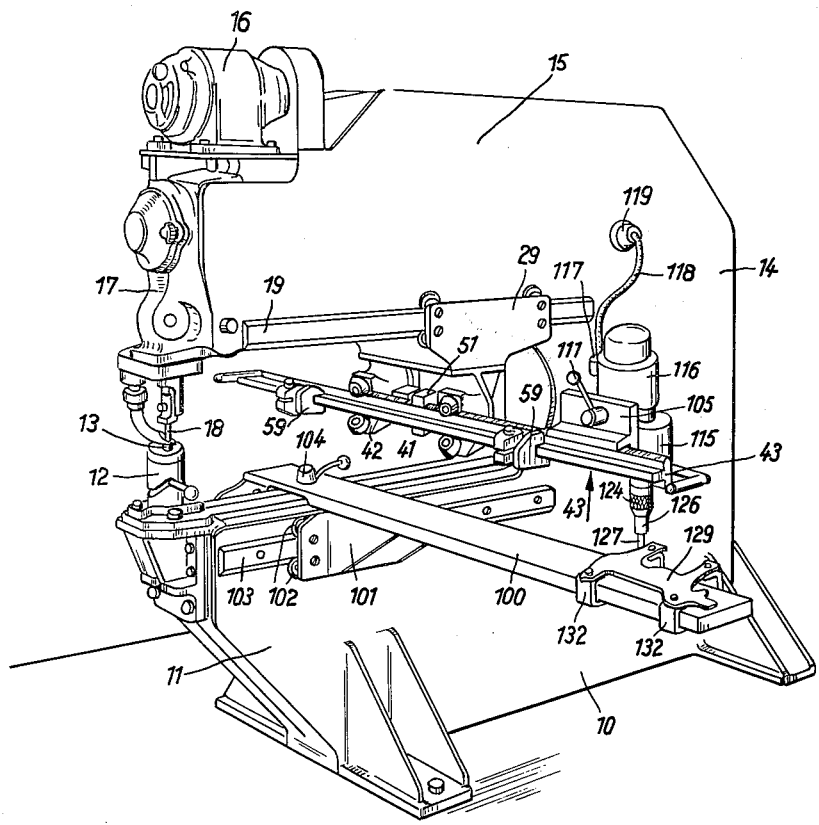
FIG. 1 is a partly schematic perspective view of a machine tool according to the present invention.
Figure 5:
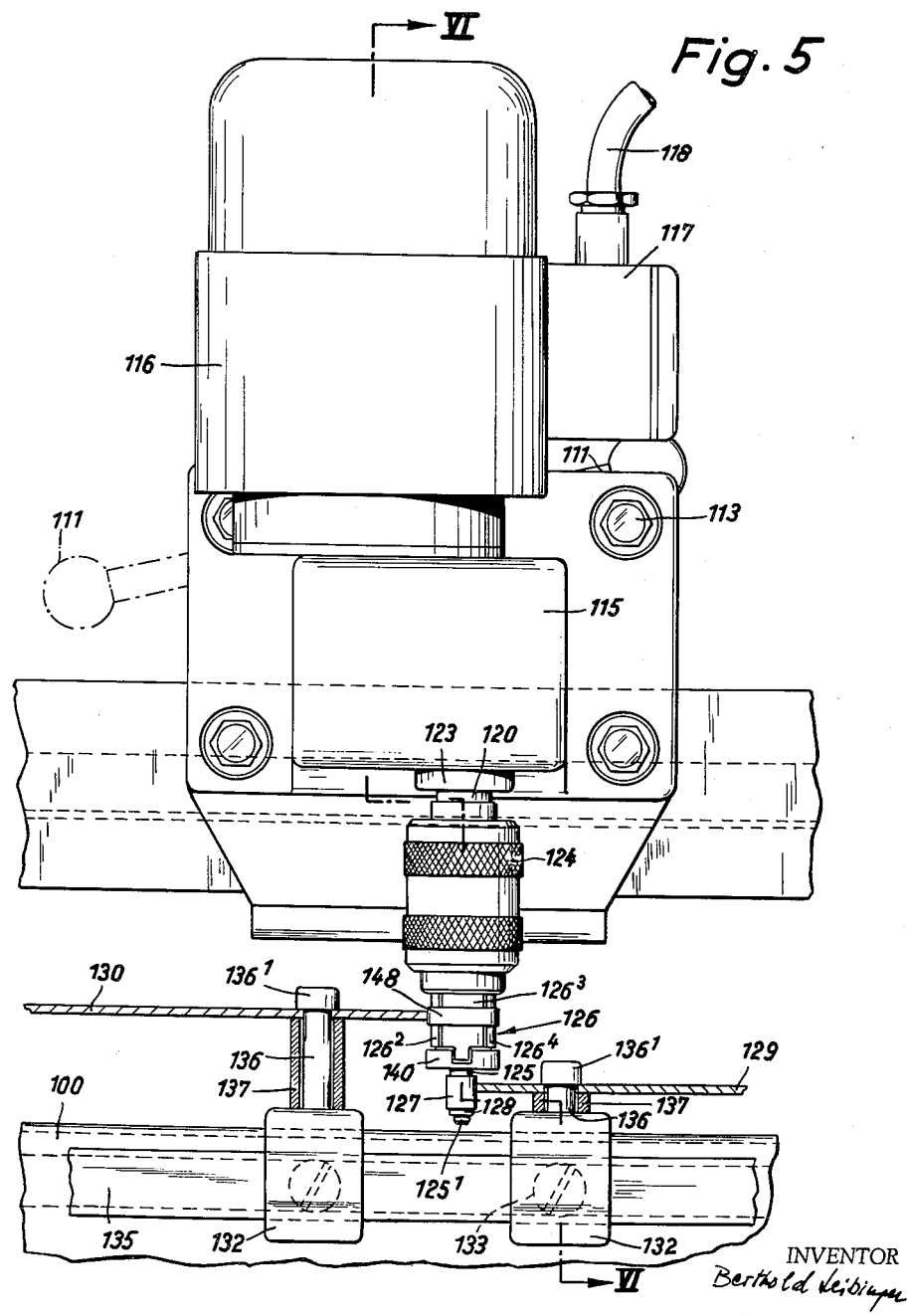
Figure 6:
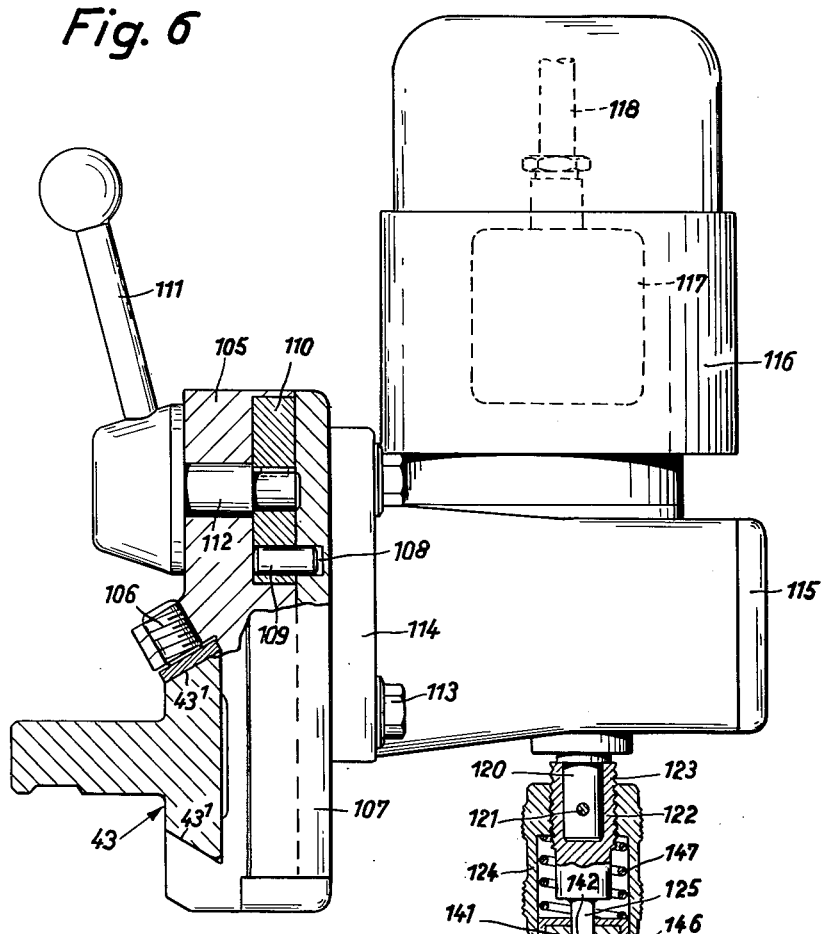
Figure 7:
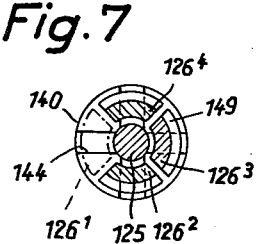

FIG. 3 is a fragmentary longitudinal, partly sectional side elevational view showing the longitudinal carriage as it appears from the right side of FIG. 1 and also showing in an end view the transverse carriage which is carried by the longitudinal carriage, FIG. 3 showing partly in section the structure which guides and supports the transversely movable carriage and also showing in section the work holding means which is carried by the transverse carriage;

FIG. 4 is a fragmentary partly sectional elevational view showing the structure for fixing the transversely movable carriage in a given position with respect to the longitudinally movable carriage;

FIG. 5 is an enlarged fragmentary elevational view, as compared with FIG. 1, showing the structure for automatically feeding the carriages from a template;

FIG. 6 is a sectional elevational view taken along line VI—VI of FIG. 5 in the direction of the arrows;

FIG. 7 is a sectional plan view taken along line VII—VII of FIG. 6 in the direction of the arrows;

FIG. 8 is a perspective elevation of a feed roller section according to the present invention;

FIG. 9 is a perspective elevation of the feed roller section of FIG. 8 as it appears from the side thereof which is not visible in FIG. 8;

FIG. 10 is a perspective view of a roller end wall adapted to cooperate with a plurality of the sections shown in FIGS. 8 and 9;

FIG. 11 is a fragmentary partly sectional elevational view showing another embodiment of the feed roller arrangement according to the present invention, FIG. 11 also showing the feeler roller of the present invention;

FIG. 12 is a top plan view of one possible template arrangement which may be used with the present invention.

Referring now to the drawings, there is shown in FIG. 1 a punch press which includes a supporting frame 10 provided with an elongated lower horizontal arm 11 which carries at its front end a die carrier 12. A die 13 is carried by the die carrier 12 and is removable therefrom in a known way so as to be replaceable with another die. The frame 10 includes a rear portion 14 which serves to support an upper elongated arm 15 of the punch press, this upper arm 15 being parallel to and spaced above the lower arm 11 and also extending substantially horizontally over the lower arm 11. The upper arm 15 carries the driving motor 16 which operates through a suitable transmission 17 on the punch 18 to reciprocate the latter vertically in a known way, this punch 18 being carried by the upper arm 15 adjacent a front end thereof. This punch 18 is in most cases, of cylindrical cross-section and is capable of cutting along the entire periphery of its bottom end face. Thus, the structure shown in FIG. 1 represents a punch press means which includes the upper arm 15, the lower arm 11, the reciprocable punch 18 carried by the upper arm 15 adjacent a front end thereof and the die 13 carried by the lower arm 11 adjacent a front end thereof beneath the punch 18 so as to cooperate with the latter.

Figure 2:
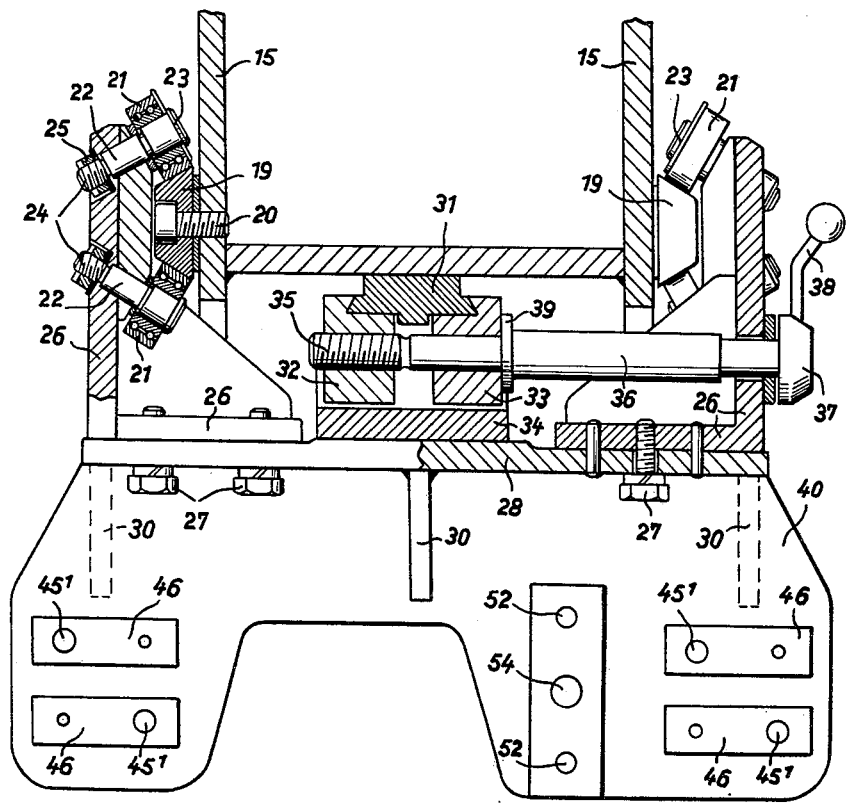
FIG. 2 is a fragmentary transverse sectional view of the structure of FIG. 1 showing the upper arm of the punch press in a transverse sectional view and showing also in a partly sectional transverse view the longitudinally movable carriage means of the present invention.

As may be seen from FIG. 2, the upper arm 15 includes a pair of spaced parallel vertical side walls, and a pair of elongated guides 19 are fixed to the exterior surfaces of the side walls of the arm 15 by screws 20 and extend horizontally along the exterior opposed side surfaces of the upper arm 15, in the manner indicated in FIGS. 1 and 2. These guide rails 19 are of trapezoidal cross-section. A plurality of rollers 21 are freely turnable along the oppositely inclined upper and lower faces of each guide rail 19. Each roller 21 is supported by a suitable ball bearing on a pin 22 for free turning movement with respect to the latter, and each pin 22 is provided at its end directed toward the arm 15 with an enlarged head 23 which engages the inner race of the ball bearing to prevent axial movement of this inner race. The opposite end of each pin 22 is provided with a threaded portion 24 so as to threadedly carry a nut 25 for fixing the pin 22 to a wall of an angle iron 26. As is shown at the left portion of FIG. 2, the vertical wall of the angle iron 26 is formed with a bore through which the pin 22 passes, this bore having a shoulder engaged by a shoulder of the pin 22 so as to limit the movement of the pin 22 away from the arm 15, and the nuts 25 serve to fix the pin 22 to the angle irons 26 in the manner shown at the left portion of FIG. 2.

A plurality of screws 27 serve to fix the lower portions of the pair of angle irons located at the opposite sides of the arm 15 to a transverse lower wall 28 which extends beneath the arm 15, so that the angle irons 26 together with the wall 28 form a substantially U-shaped carriage which embraces the lower portion of the arm 15. Thus, this structure forms the longitudinal carriage means 29 which is longitudinally movable along the upper arm 15 toward and away from the punch 18 and which is located in part between the arms 15 and 11. The lower wall 28 of the carriage 29 is provided with stiffening ribs or plates 30.

A suitable means is provided for releasably fixing the longitudinally movable carriage 29 in a desired position along the upper arm 15, and this means includes an elongated rail 31 (FIG. 2) fixed to and extending along the underside of the upper arm 15. This rail 31 has a substantially dovetail cross-section, as shown in FIG. 2, and a pair of gripping members 32 and 33 engage the opposite side edges of the rail 31. These gripping members 32 and 33 are transversely shiftable in a guide member 34 of substantially U-shaped cross-section which is fixed to the top surface of the wall 28 beneath the arm 15. The gripping member 32 is formed with a threaded bore passing therethrough, and an externally threaded pin 35 extends threadedly into this bore. This pin 35 is fixed at its right end, as viewed in FIG. 2, to an elongated spindle 36 which passes freely through a bore of the gripping member 33, and the spindle 36 passes freely through an opening in the vertical wall of the right member 26 of FIG. 2 so as to be accessible at the exterior of the longitudinal carriage 29. At its outer right end, as viewed in FIG. 2, a handle 38 is fixed at its hub 37 to the spindle 36 so that upon turning of the handle 38 the spindle 36 will turn about its axis. The spindle 36 is provided next to the gripping member 33 with an annular flange 39 extending radially from the spindle 36 and pressing with its left face, as viewed in FIG. 2, against the gripping member 33. Thus, by turning the spindle 36 in one direction the gripping members 32 and 33 may be drawn toward each other so as to tightly grip the rail 31 for fixing the carriage 29 in a predetermined longitudinal position along the upper arm 15, while turning of the spindle 36 in the opposite direction will cause the gripping members 32 and 33 to move apart from each other so as to release the carriage 29 for movement longitudinally along the upper arm 15. The guide 34 for the gripping members 32 and 33 not only guides them for movement toward and away from each other, but this guide member 34 acts additionally to prevent turning of the gripping members 32 and 33.

A substantially vertical carrier wall 40 extends transversely with respect to the arm 15 across the underside of the plate 28 and is fixed to the latter. It will be noted from FIG. 2 that one stiffening plate 30 is located in front of the plate 40, while the other two stiffening plates are located to the rear of the plate 40, and the latter may be fixed to the underside of the wall 28 in any suitable way as being welded thereto, for example, Also, the plates 30 may be fixed to the underside of the wall 28 as by being welded thereto, for example. As may be seen from FIG. 1, this carrier wall 40 carries a pair of guide means 41 and 42 which serve to support and guide a transverse carriage 43 for transverse movement with respect to the longitudinal carriage 29. Thus, the transverse carriage 43 is carried by the longitudinal carriage 29 for movement with the latter longitudinally of the arm 15, and at the same time the carriage 43 is movable transversely of the carriage 29 and the arm 15.

Each of the bearing means 41 and 42 includes a substantially U-shaped member 44 (FIG. 3) which is fixed to the front face of the carrier wall 40. The vertical wall 44' of the member 44 is fixed by the screws 45 to the wall 40, these screws 45 extending respectively through the openings 45' formed in the wall 40 (FIG. 2). At its front face the wall 40 has projections thereof which are machined so as to provide the smooth surfaces 46 which are very precisely positioned for receiving the members 44 so as to accurately position the latter. The upper and lower portions of each U-shaped member 44 serve to support the rollers 47 and 48 which cooperate with the transverse carriage 43 to guide the latter.

This transverse carriage 43 is made of an elongated bar of substantially T-shaped cross-section, and the rear vertical wall of this bar (FIGS. 3 and 4) is formed with a pair of oppositely inclined upper and lower surfaces 43' so that the rear wall of the T-bar has a substantially dovetail cross-section. The upper and lower rollers 47 are suitably inclined so as to cooperate with the surfaces 43', respectively, for guiding the transverse carriage 43. These rollers 47 are respectively carried by pins 49 in the manner shown most clearly at the lower portion of FIG. 3, and these pins 49 are fixed to the upper and lower edge portions of each member 44. The guide rollers 48 engage the rear face 432 of the rear wall of the carriage 43, and these rollers 48 are carried by a vertical pin 50 which is in turn carried by the member 44 in the manner shown in FIG. 3 and serve to turnably support the rollers 48.

The carriage 43 is easily movable along the above-described guide means transversely of the carriage 29 and the arms 15 and 11. The carriage 29 carries a device 51 (FIG. 4) which serves as a means for releasably fixing the transverse carriage 43 in any desired position with respect to the carriage 29. Thus, as may be seen from FIG. 4, the device 51 includes a substantially U-shaped gripping member 51' which is supported by guide pins 52 for movement toward and away from the wall 40. These guide pins 52 are fixed to the wall 40 and extend substantially horizontally in a direction perpendicularly therefrom into mating bores of the member 51 which respectively slidably receive the guide pins 52 in a manner shown in FIG. 4. At its free left ends, as viewed in FIG. 4, the clamping member 51' is provided with inclined surfaces which are respectively inclined in the same way as and engage the surfaces 43' of the carriage 43. A spindle 53 of the device 51 extends freely through a bore 54 of the wall 40, and at the rear face of the wall 40 the spindle 53 is fixed to a hub 55 of a handle 56 which may be turned by the operator in order to turn the spindle 53. At its portion which extends forwardly from the wall 40 the spindle 53 is provided with a thread 53' which threadedly cooperates with a threaded bore of the clamping member 51'. The spindle 53 has an extension $53^2$, and this extension has a smaller diameter than the threaded portion 53' of the spindle 53. This extension of the spindle extends into an opening of a pressure member 57 which is freely turnable on the extension $53^2$ of the spindle 53.

A screw member 58 is threaded into the spindle 53 from its left end, as viewed in FIG. 4, and a suitable washer is located between the head of the screw member 58 and the pressure member 57 as indicated in FIG. 4, so that in this way the pressure member 57 is carried by the spindle 53 after the latter is passed through the aligned bores of the wall 40 and the clamping member 51'. When the handle 56 is turned in one direction, the spindle 53 will be turned so as to thread the portion 53' thereof into the clamping member 51', and since the latter cannot turn as a result of the cooperation of the guide pins 52 with the member 51', the latter will be drawn toward the wall 40 so as to cause the clamping member 51 to clamp tightly against the upper and lower faces of the rear wall of the carriage 43. Continued turning of the spindle 53 in this direction will cause the pressure member 57 to press against the rear face of the transverse carriage 43, and in this way the rear wall of the carriage 43 is tightly clamped between the member 51', on the one hand, and the pressure member 57, on the other hand, and thus it is possible to fix the transverse carriage 43 in any desired position with respect to the carriage 29, as when it is desired to advance the work only longitudinally. When the spindle 53 is turned by the operator in the opposite direction the device 51 is actuated so as to release the transverse carriage 43 for free movement with respect to the longitudinal carriage 29.

The transverse carriage 43 carries a holding means which serves to support the work sheet in a predetermined plane while it is being acted upon by the punch press so that this work sheet can be moved in all directions in this plane. For this purpose the forwardly extending horizontal wall $43^3$ of the carriage 43 is formed in its underside with an elongated groove $43^4$ extending longitudinally along the carriage 43 and having a substantially trapezoidal cross-section, as indicated in FIG. 4. The work holding means includes a pair of devices 59 which are identical with each other and spaced from each other along the carriage 43, as shown in FIG. 1. The details of each of the devices 59 is indicated in FIG. 3. Thus, each device 59 includes a substantially U-shaped member 61 which embraces the front free edge of the carriage 43. The lower portion of each member 61 is formed with an upwardly directed recess which receives a slide block 62 which is fixed in this way to each member 61, and the slide block 62 is slidable along the lower groove formed in the horizontal wall of the carriage 43. Between the upper portion of each member 61 and the horizontal wall of the carriage 43 is a pressure member 63 which is engaged by the bottom end of a screw 64 extending threadedly through the upper portion of the member 61, and thus by tightening the screw 64 it is possible to fix the member 61 of each device 59 at a desired position along the carriage 43 for movement with the latter.

Each member 61 is provided with a pair of forwardly extending spaced side walls 65 which carry a horizontal pivot pin 66 which extends across the space between the side walls 65. A gripping means is turnably supported by the pivot pin 66, and this gripping means has a lower portion 67 extending into the space between the walls 65 and formed with a bore through which the pivot pin 66 passes so that the member 67 is freely turnable about the horizontal axis of the pivot pin 66. This gripping means includes in addition to the lower part 67 and upper gripping jaw 68 formed with a bore through which a bolt 69 passes, this bolt 69 having a lower threaded portion which cooperates threadedly with a threaded bore of the lower gripping member 67. As is apparent from FIG. 3, the head of the bolt 69 cooperates with a suitable washer which bears against the upper gripping member 68, and a spring 70 is coiled about the bolt 69 and bears against a washer which is urged by the spring 70 against the upper member 68 and also against a shoulder formed in an enlarged portion $67^3$ of the threaded bore of the member 67. Thus, the spring 70 will urge the jaws of the gripping device 67, 68 apart from each other when the screw 69 is loosened. It will be noted from FIG. 3 that the lower jaw member 67 is provided with substantially perpendicular plane surfaces 67' and $67^2$ which respectively engage surfaces of the work sheet 60 which may be sheet metal, for example. Thus, the vertical surface $67^2$ forms a stop which cooperates with an edge of the work sheet to precisely determine the position of the work sheet with respect to the work holding means.

The structure of the invention includes a third carriage 100 which is longitudinally movable along the lower arm 11 of the punch press means. This carriage 100 includes a supporting portion 101 which is guided by rollers 101 for movement longitudinally along the rails 103 in the same way that the carriage 29 is supported by the rollers 21 for movement along the rails 19, so that the details of the structure which supports the carriage 100 need not be described, this structure having the same details as the structure shown in FIG. 2 for the carriage 29. The carriage 100 is additionally provided with a releasable clamping device 104 of any suitable construction for releasably fixing the carriage 100 in any desired position along the lower arm 11.

The carriage 100 serves to support a template which through a suitable structure cooperates with the carriages 29 and 43 for automatically moving a work sheet 60 while it is being acted upon by the punch 18 and the die 13 so as to cause the punch 18 and the die 13 to cut from the work sheet a portion thereof which will leave a work sheet portion having a configuration corresponding to that of the template. The structure for automatically controlling the carriages 29 and 43 in this manner is shown in FIGS. 5–12.

This structure for automatically moving the carriages includes a base member 105 (FIG. 6) formed with a substantially dovetail slot which receives the rear wall of the carriage 43 in a manner shown in FIG. 6 so that the entire structure for controlling the carriages is carried by the transverse carriage 43. This base or carrier member 105 receives a plurality of screw members 106 which may be turned by the operator so as to press suitable pressure plates against the upper surface of the rear wall of the carriage 43 in a manner shown in FIG. 6 for releasably fixing the carrier plate 105 in any desired position along the carriage 43. The carriage 43 thus carries the entire structure for controlling the movement of the carriages. The base plate 105 is provided at its right face, as viewed in FIG. 6, with a vertically extending guiding protection of dovetail cross-section which is slidably received in a mating dovetail groove of a slide member 107 which is thus guided for vertical movements upwardly and downwardly with respect to the carrier member 105. This slide member 107 is formed in its face which is directed toward the member 105 with a horizontally extending groove 108, and a pin 109 extends into this groove 108 in the manner shown in FIG. 6. The pin 109 is fixedly carried by a disk 110 which is supported at its center for turning movement on the carrier member 105, and it will be noted that the pin 109 is spaced radially from the center of the disk 110, so that the parts 109 and 110 form a crank which will raise and lower the slide 107 upon turning of the disk 110 around its axis. The horizontal groove 108 which receives the pin 109 is long enough to provide for complete turning of the disk 110. In other words, the length of the groove 108 is at least equal to the diameter of the circle described by the pin 109 during turning of the disk 110. This disk 110 is fixed to a shaft 112 which is turnably supported by the carrier member 105, and a handle 111 is fixed to the shaft 112 to enable the operator to turn the shaft 112 for the purposes of raising or lowering the slide member 107.

A plurality of screw members 113 serve to fix to the right face of the vertical slide member 107 a base member 114 of a transmission housing 115 which houses an unillustrated transmission providing a gear reduction for the drive from a motor 116 carried by the housing 115. The electric motor 116 has its exterior housing connected to an enclosure 117 for the electrical leads of the motor which are connected with the cable 118 which is connected to and extends from the enclosure 117, and this cable 118 is provided at its end distant from the motor 116 with a plug 119 cooperating with a socket carried by the machine in a manner shown in FIG. 1 and connected in any suitable way with a source of electrical current for supplying the motor 116.

The bottom wall of the transmission housing 115 is formed with an opening through which the drive shaft 120 passes, and this drive shaft 120 carries a cross pin 121 which serves to fix to the drive shaft 120 a sleeve 122 which receives in its interior the drive shaft 120 and which extends downwardly from the shaft 120 so as to form a downward extension thereof. The sleeve 122 is formed with exterior threads 123 which serve to threadedly mount on the upper portion of the sleeve 122 an outer sleeve 124 which is open at its lower end, as indicated in FIG. 6. Beneath the shaft 120 the sleeve 122 is fixed with a coaxial extension 125 of the shaft 120, and this extension 125 carries a feed roller means 126 which turns with the sleeve 125 and which is coaxial therewith. The extension 125 is formed at its lower portion with an elongated part 125' of reduced outer diameter, and this lower portion 125' of the extension 125 is coaxial with the drive shaft 120 and serves to turnably support a feeler roll 127 for free turning movement about the portion 125'. The outer diameter of the feeler roll 127 is the same as the diameter of the cylindrical punch 18. Adjacent its bottom end the portion 125' of the extension 125 is formed with an annular groove which receives a snap ring 128 against which the bottom face of the roll 127 rests, so that in this way the roll 127 is prevented from falling from the guide shaft portion 125'.

The feeler roll 127 engages the exterior periphery of a positive template 129 provided at its exterior periphery with a configuration corresponding to that of the piece which is to be cut from the work sheet 60. The term "positive template" is intended to refer to a template which has an outer edge of predetermined configuration which serves as a guide. It will be noted from FIGS. 5 and 6 that the positive template 129 is parallel to and located at a lower elevation than a cooperating negative template 130. The term "negative template" is intended to refer to a template formed with an opening defined by an edge of a configuration corresponding to that of the positive template. In FIG. 1 only the positive template 129 is shown for the sake of clarity. It is to be understood, however, as indicated in FIGS. 5 and 6, that the negative template 130 is supported at an elevation higher than the positive template 129 and has its inner peripheral edge located outwardly of the outer peripheral edge of the template 129. If the inner peripheral edge of the template 130 and the outer peripheral edge of the template 129 are projected onto a common horizontal plane, it will be seen that these edges have substantially the same configuration with the edge of the negative template being larger than and surrounding the edge of the positive template. This relationship between the positive template 129 and negative template 130 is illustrated in FIG. 12 from where it may be seen that when the two templates are located in a common horizontal plane the distance between the outer edge of the positive template and the inner edge of the negative template is equal to the distance $a$ indicated in FIG. 12. This distance $a$ is equal to the width of the gap 131 illustrated in FIG. 12 between the templates, and this distance $a$ is equal to one half the sum of the diameters of the feed roller 126 and the feeler roll 127. When automatically guided by the templates shown in FIG. 12, the work sheet will be moved with respect to the punch 18 so that the latter will cut from the work sheet a portion thereof having the configuration of the template 129.

As may be seen from FIGS. 5 and 6, an elongated guide rail 135 is carried by a front wall of the carriage 100, and a similar unillustrated guide rail is carried by the rear wall of the carriage 100. As is shown particularly in FIG. 6, the guide rail 135 is fixed to the carriage 100 by screw member 133 passing through a bore in the wall of the carriage 100 and cooperating with a nut 134, a suitable spacer sleeve and washer being located between the head of the screw member 133 and the carriage 100 for fixing the rail 135 to the latter. A plurality of holders 132 form part of the support means for the templates. Each of these holders 132 has a cross-sectional configuration illustrated in FIG. 6, and it will be seen from FIG. 6 that these holders 132 are slidable along the rails 135. In addition, the holders 132 are formed with horizontal slots 132' which permit the upper and lower portions of each holder 132 to be drawn toward each other so as to be clamped on the rail 135 in a desired position. For this purpose each holder 132 is vertically bored, and the portion of the vertical bore beneath the slots 132' is threaded. A bolt 136 extends threadedly into the bore of the holder 132 and cooperates with the threaded lower portion of the bore of the member 132. The head 136' of the bolt 136 bears against the top surface of the template, and a spacer 137 through which the bolt 136 passes is located between the holder 132 and the lower surface of the template to determine the elevation of the latter. Thus, as may be seen from FIG. 5, the only difference between the support means for the positive template 129 and the support means for the negative template 130 is that the spacers 137 have different lengths and of course the bolts 136 will also have different lengths. In this way, the negative template 130 is supported at a higher elevation than the positive template 129. When the bolts 136 are tightened, not only do they press the template against the spacer 137, but also they draw together the upper and lower portions of each holder 132 so as to clamp the latter on the rail 135 and thus fix the position thereof.

In order to guarantee continuous engagement between the feeler roll 127 and the outer edge of the positive template 129 and on the other hand continuous engagement between the feed roller means 126 and the inner edge of the negative template 130, so as to provide sufficient frictional engagement between the feed roll means 126 and the negative template 130, this feed roll means 126 is constructed so that it can automatically change its diameter in order to compensate for variations in the width $a$ of the gap 131, such variations resulting from inaccuracies which occur in the manufacture of the templates. The details of the feed roll means which enables it to accomplish this result are illustrated in FIGS. 5–11. Referring first to FIGS. 5–10, it will be seen that the feed roll means 126 is composed of a plurality of longitudinal roller sections 126′ shown in FIGS. 8 and 9. Actually, in the illustrated example there are four such separate roller sections 126′, 126², 126³, and 126⁴ which are separate from each other, as indicated in FIG. 7, which extend parallel to the axis of the feed roll, and which are distributed about this axis. The details of the roller section 126′, shown in FIGS. 8 and 9, are included in each of the four feed roller sections. As may be seen from FIGS. 8 and 9, each of these longitudinal roller sections is provided with upper and lower extensions 143′ which terminate in a pair of inclined opposed end faces 143. These end faces 143 of the several roller sections form portions of the surface of a pair of cones. The feed roller means 126 in addition includes a pair of end walls 141 and 140, and these end walls are of an identical construction. The details of each end wall are shown in FIG. 10 from where it may be seen that each of these end walls is provided with a plurality of radial grooves 144. In the illustrated example there are four such grooves 144, and the base surface of each of these grooves also forms a part of a cone. As may be seen particularly from FIG. 6, the end walls 140 and 141 are formed with a pair of aligned coaxial bores through which the extension 125 passes, and this extension 125 carries a pair of keys 142 located in axial grooves of the end walls 140 and 141 so that these end walls are constrained to turn with the extension 125 while being axially movable therealong. The projections 143′ of the several sections 126′–126⁴ respectively extend into the grooves 144, and the end faces 143 cooperate with the base surfaces of these grooves, respectively, so as to be slidable with respect thereto. It will be noted from FIG. 6, that the base surfaces of the grooves as well as the end faces 143 form surface portions of a pair of cones whose apexes are directed toward each other and whose bases are directed away from each other. It will be noted that at the opposite side of each projection 143′, each of the roller sections 126′–126⁴ is formed with a pair of surfaces shown in FIG. 9. Thus, it may be seen from FIG. 9 at each side of the lower projection the rolier section is formed with a pair of surfaces 138 and at each side of the upper projection a pair of surfaces 139 are provided, and these surfaces 138 and 139 are respectively slidable along the exterior frusto-conical surfaces of the end walls which extend between the radial grooves 144 thereof. As a result of the extension of the projections 143′ into the grooves 144, the several longitudinal roller sections are constrained to turn with the end walls 140 and 141. Furthermore, as these end walls approach each other these roller sections will necessarily move outwardly away from the axis of the shaft extension 125, while when the end walls 140 and 141 move away from each other, these roller sections 126′–126⁴ are free to move inwardly toward the axis of the shaft extension 125.

As may be seen from FIG. 6, the shaft extension 125 is provided at the top of the portion 125′ thereof with an annular groove which receives a snap ring 145, and the lower end wall 140 rests on this snap ring so that the lower end wall 140 cannot move downwardly beyond the position thereof indicated in FIG. 6. The upper end wall 141 is received in the interior of a sleeve 146 which has a top end wall through which the shaft extension 125 freely passes. The lower annular portion of the sleeve 146 surrounds the upper portions of the longitudinal roller sections 126′–126⁴, so as to limit the movement of these roller sections outwardly away from the axis of the shaft extension 125. Furthermore, it will be noted that the sleeve 146 extends slidably into the sleeve 124, and a coil spring 147 is housed within the sleeve 127, pressing with its bottom end against the sleeve 146 and with its top end against the top wall of the sleeve 124. Therefore, this coil spring 147 urges the upper end wall 141 downwardly toward the lower end wall 140 so as to continuously urge the longitudinal roller sections outwardly away from the axis of the shaft extension 125.

As may be seen from FIG. 8, each of the longitudinal roller sections is formed with an arcuate groove 149 between its ends. The several grooves 149 extend along a common circle and receive an annular elastic band 148 of rubber or the like. This band 148 serves to uniformly move all of the roller sections inwardly toward the axis of the shaft axis 125, so that the longitudinal roller sections are always located equidistant from this axis. Furthermore, the band 148 serves as a friction material engaging the inner periphery of the negative template 130 to guarantee that there is sufficient friction between the feed roll means 126 and the negative template to guarantee the necessary feeding of the carriages. The spring 147 is of course stronger than the elastic force of the band 148 and guarantees that if there are any inaccuracies in the width of the gap 131 which cause this width to become larger, the upper end wall 141 will immediately move downwardly toward the lower end wall 140 so as to spread the roller sections outwardly away from each other and reliably maintain the feed roll means 126 in engagement with the negative template 130. On the other hand, if the width $a$ of the cap 131 (FIG. 12) should become smaller, then the edge of the negative template 130 will act to move the longitudinal roller sections next to the template 130 inwardly toward the axis of the shaft extension 125, and all of the feed roller sections will necessarily move also inwardly toward this axis by the same amount as the result of the elastic band 148. In this way the feed roll means 126 is capable of automatically adapting itself to variations in the width of the gap 131 (FIG. 12) while at the same time guaranteeing sufficient frictional contact between the feed roll means 126 and the edge of the negative template 130 to provide the desired movement of the carriages.

In the embodiment of the invention which is illustrated in FIG. 11, instead of a groove 149 as shown in FIG. 8, the several longitudinal feed roller sections are formed with pairs of exterior grooves axially spaced from each other and respectively receiving the elastic rings 151 shown in FIG. 11. These rings 151 act in the same way as the ring 148 to guarantee that all of the longitudinal roll sections move inwardly toward the axis of the shaft extension 125 by the same amount. Between the rings 151 the exterior surfaces of the several longitudinal roll sections are suitably roughened at 152 (FIG. 11) as by being knurled, for example, so as to provide a high frictional contact between the surfaces 152 and the inner edge of the negative template 130.

It is apparent that with the above-described structure the carriages 29 and 43 will be automatically controlled according to the configuration of the templates so as to automatically move the work sheet 60 in all directions in its own plane to cause the continuously reciprocating punch 18 to punch from the work sheet a slot corresponding to the configuration of the gap 131 shown in FIG. 12, and when one end of the slot reaches the starting end thereof, a piece corresponding to the configuration of the positive template 129 will have been cut by the punch press from the work sheet. The transmission 17 which may be of any suitable well known construction for continuously and rapidly reciprocating the punch 18 causes the latter to move continuously up and down so as to continuously cut away portions of the work sheet during the movement thereof by the carriages.

In order to be able to replace one pair of positive or negative templates with another pair or in order to stop the automatic operation so that the machine may be manually operated, it is only necessary to turn the handle 111 so as to cause the slide member 107 to be raised, and this will result in elevation of the feed roll means 126 and the feeler roller 127 beyond the templates 129 and 130 so that the carriage 100 or the carriage means 29, 43 may be actuated to place the templates out of alignment with and spaced from the feed roll means and feeler roll to give free access to the templates for changing the same.

It will be understood that each of the elements described above, or two or more together, may also find a useful application in other types of machine tools differing from the types described above.

While the invention has been illustrated and described as embodied in punch presses, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of the prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A feed roller for use in automatic machine tools and adapted to cooperate with a template, said feed roller comprising, in combination, a plurality of longitudinal roller sections separate from each other, arranged along a given cylinder, and extending parallel to and distributed about the axis of said cylinder; a pair of end wall means cooperating with said longitudinal roller sections to guide said roller sections for radial movement inwardly toward and outwardly away from said axis; limiting means cooperating with said longitudinal roller sections for limiting the movement thereof outwardly away from said axis; and urging means cooperating with said longitudinal roller sections for constantly urging the latter yieldably outwardly away from said axis and toward said limiting means, whereby upon application of inwardly directed pressure against said sections, greater than that which urges the same outwardly, said sections yieldably move away from said limiting means toward said axis.

2. A feed roller for use in automatic machine tools and adapted to cooperate with a template, said feed roller comprising, in combination, a plurality of longitudinal roller sections separate from each other, arranged along a given cylinder, and extending parallel to and distributed about the axis of said cylinder; a pair of end wall means cooperating with said longitudinal roller sections to guide said roller sections for radial movement inwardly toward and outwardly away from said axis; urging means cooperating with said longitudinal roller sections for constantly urging the latter yieldably outwardly away from said axis while permitting said sections to yieldably move toward said axis upon application of an inwardly directed pressure upon said sections greater than that which urges the same outwardly; limiting means cooperating with said longitudinal roller sections for limiting the movement thereof outwardly away from said axis; and annular resilient means sourrounding and engaging said longitudinal roller sections and urging the same inwardly toward said axis with a force less than that which urges said longitudinal roller sections outwardly away from said axis.

3. A feed roller for use in automatic machine tools and adapted to cooperate with a template, said feed roller comprising, in combination, a plurality of longitudinal roller sections separate from each other, arranged along a given cylinder, and extending parallel to and distributed about the axis of said cylinder; a pair of end wall means cooperating with said longitudinal roller sections to guide said roller sections for radial movement inwardly toward and outwardly away from said axis; urging means cooperating with said longitudinal roller sections for constantly urging the latter yieldably outwardly away from said axis while permitting said sections to yieldably move toward said axis upon application of an inwardly directed pressure upon said sections greater than that which urges the same outwardly; limiting means cooperating with said longitudinal roller sections for limiting the movement thereof outwardly away from said axis; and annular resilient means surrounding and engaging said longitudinal roller sections and urging the same inwardly toward said axis with a force less than that which urges said longitudinal roller sections outwardly away from said axis, said annular resilient means being in the form of an endless band of an elastomeric material, said longitudinal roller sections being respectively formed with arcuate grooves in their outer surfaces to receive said band therein, and said band also functioning as a friction surface for prividing a good frictional engagement between the feed roller and the edge of a template.

4. A feed roller for use in automatic machine tools and adapted to cooperate with a template, said feed roller comprising, in combination, a plurality of longitudinal roller sections separate from each other, arranged along a given cylinder, and extending parallel to and distributed about the axis of said cylinder; a pair of end wall means cooperating with said longitudinal roller sections to guide said roller sections for radial movement inwardly toward and outwardly away from said axis; urging means cooperating with said longitudinal roller sections for constantly urging the latter yieldably outwardly away from said axis while permitting said sections to yieldably move toward said axis upon application of an inwardly directed pressure upon said sections greater than that which urges the same outwardly; limiting means cooperating with said longitudinal roller sections for limiting the movement thereof outwardly away from said axis; and annular resilient means surrounding and engaging said longitudinal roller sections and urging the same inwardly toward said axis with a force less than that which urges said longitudinal roller sections outwardly away from said axis, said annular resilient means comprising a pair of axially spaced annular resilient rings engaging said longitudinal roller sections at their outer surfaces and urging them inwardly toward the axis of the cylinder, said longitudinal roller sections having roughened exterior surfaces between said rings for engaging the edge of a template.

5. A feed roller for use in a machine tool or the like and adapted to cooperate with a template, said feed roller comprising, in combination, a pair of spaced coaxial end walls respectively having directed toward each other surface portions which respectively form parts of a pair of conical faces whose apexes are directed toward each other and whose bases are directed away from each other; means connecting said end walls to each other to maintain them coaxial with each other and to prevent angular displacement of one of said end walls with respect to the other while freeing said end walls for movement toward and away from each other, so that said end end walls are constrained to rotate together about their common axis but are free to move toward and away from each other; a plurality of longitudinal roller sections separate from each other, distributed about the common axis of said end walls, located between said end walls, and extending parallel to said axis, each of said sections having a pair of opposed end faces which respectively also form part of said conical faces, said end faces of said roller sections respectively engaging and being slidable with respect to said surfaces of said end walls, so that when said end walls approach each other said roller sections will move outwardly away from the common axis of said end walls while when said end walls move away from each other said roller sections will be free to move inwardly toward the axis of said end walls, so that the effective diameter of the feed roll will be respectively increased and decreased; first yieldable resilient means cooperating with said roller sections for exerting a pressure upon the same in direction toward said axis; second yieldable resilient means cooperating with at least one of said end walls for urging the latter toward the other of said end walls, so that said second yieldable resilient means will urge said roller sections outwardly away from said axis with a force greater than that which is exerted by said first yieldable resilient means; and limiting means cooperating with said sections for limiting the movement thereof outwardly away from said axis.

6. A feed roll as recited in claim 5 and wherein each of said end walls is formed with a plurality of grooves extending radially with respect to and distributed about said common axis, and the surfaces of said end walls forming the bases of said grooves, said longitudinal roller sections respectively having end projections extending into said grooves and provided with end faces which engage said surfaces, so that said roller sections are constrained to turn with said end walls.

7. A feed roll as recited in claim 6 and wherein each of said end walls is axially bored, said means connecting said end walls together for rotation together and supporting the same for axial movement toward and away from each other including a shaft extending through the axial bores of said end walls, fixed to one of said end walls, and passing freely through the other of said end walls, and said other end wall being axially slidable along said shaft while constrained to rotate therewith, so that said other end wall is movable toward and away from said one end wall.

8. A feed roller for use in automatic machine tools and adapted to cooperate with a template, said feed roller comprising, in combination, a plurality of longitudinal roller sections separate from each other, arranged along a given cylinder, and extending parallel to and distributed about the axis of said cylinder; a pair of end wall means cooperating with said longitudinal roller sections to guide said roller sections for radial movement inwardly toward and outwardly away from said axis; resilient urging means cooperating with said longitudinal roller sections for constantly urging the latter yieldably outwardly away from said axis; and limiting means cooperating with said longitudinal roller sections for limiting the movement thereof outwardly away from said axis.

9. In a feed arrangement for use in automatic machine tools, in combination, a template and a feed roller cooperating with said template and comprising a plurality of longitudinal roller sections separate from each other, arranged along a given cylinder and extending parallel to and distributed about the axis of said cylinder, a pair of end wall means cooperating with said longitudinal roller sections to guide said roller sections for radial movement inwardly toward and outwardly away from said axis, spring means cooperating with said longitudinal roller sections for constantly urging the latter yieldably outwardly away from said axis against an edge of said template, and limiting means cooperating with said longitudinal sections for limiting the movement thereof outwardly away from said axis, whereby said spring means will tend to keep said roller sections in contact with the edge of said template.

10. In a feed arrangement for use in automatic machine tools, in combination, template means having a pair of substantially parallel edges spaced from each other and respectively arranged in a pair of substantially parallel planes; feed roller means cooperating with said template means and comprising a feeler roll cooperating with one of said template edges, a plurality of longitudinal roller sections separate from each other, arranged along a given cylinder coaxial with said feeler roll, and extending parallel to and distributed about the axis of said cylinder, said plurality of longitudinal roller sections cooperating with the other of said template edges, a pair of end wall means cooperating with said longitudinal roller sections to guide said roller sections for radial movement inwardly and outwardly away from said axis, urging means cooperating with said longitudinal roller sections for constantly urging the latter yieldably outwardly away from said axis, and limiting means cooperating with said longitudinal roller sections for limiting the movement thereof outwardly away from said axis; and means for rotating said feed roller means about said axis, whereby said urging means will assure contact between said longitudinal roller sections with the other of said template edges during rotation of said feed roller means about said axis.

References Cited in the file of this patent

UNITED STATES PATENTS

| | | | |
|---|---|---|---|
| 763,251 | Breck | June 21, | 1904 |
| 978,486 | Reed | Dec. 13, | 1910 |
| 1,472,034 | Asquith | Oct. 30, | 1923 |
| 2,044,640 | Schuster | June 16, | 1936 |
| 2,212,886 | Ruland | Aug. 27, | 1940 |
| 2,348,875 | Beard | May 16, | 1944 |
| 2,367,831 | Mason | Jan. 23, | 1945 |